(12) United States Patent
Tsutsumi et al.

(10) Patent No.: US 9,394,817 B2
(45) Date of Patent: Jul. 19, 2016

(54) COOLING STRUCTURE FOR UREA AQUEOUS SOLUTION CONDUIT

(71) Applicant: KOMATSU LTD., Minato-ku, Tokyo (JP)

(72) Inventors: Katsuhiro Tsutsumi, Hitachinaka (JP); Hirofumi Miyamoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 47 days.

(21) Appl. No.: 14/414,640

(22) PCT Filed: Sep. 5, 2013

(86) PCT No.: PCT/JP2013/073945
§ 371 (c)(1),
(2) Date: Jan. 13, 2015

(87) PCT Pub. No.: WO2014/065023
PCT Pub. Date: May 1, 2014

(65) Prior Publication Data
US 2015/0176451 A1    Jun. 25, 2015

(30) Foreign Application Priority Data

Oct. 25, 2012 (JP) .................... 2012-235913

(51) Int. Cl.
*F01N 3/05* (2006.01)
*B01D 53/86* (2006.01)
(Continued)

(52) U.S. Cl.
CPC ..... *F01N 3/05* (2013.01); *B01D 53/86* (2013.01); *B01D 53/90* (2013.01); *B01D 53/94* (2013.01);
(Continued)

(58) Field of Classification Search
CPC ..... F01N 3/055; F01N 3/2066; F01N 13/001; F01N 13/143; F01N 2260/022; F01N 2470/08; F01N 2590/08; F01N 2610/02; F01N 2610/11; F01N 2610/14; F01P 2001/005; F28D 9/0043
USPC ............................ 60/286, 295, 298, 301, 320
See application file for complete search history.

(56) References Cited

U.S. PATENT DOCUMENTS

| 6,539,708 B1 | 4/2003 | Hofmann et al. |
| 2001/0007292 A1 | 7/2001 | Yabf |

(Continued)

FOREIGN PATENT DOCUMENTS

| EP | 2159389 A1 | 3/2010 |
| EP | 2628911 A1 | 8/2013 |

(Continued)

OTHER PUBLICATIONS

Japanese Office Action dated Jan. 6, 2015, issued in counterpart Japanese Application No. 2012-235913.

(Continued)

*Primary Examiner* — Thomas Denion
*Assistant Examiner* — Jorge Leon, Jr.
(74) *Attorney, Agent, or Firm* — Holtz, Holtz & Volek PC

(57) ABSTRACT

In a working vehicle, an exhaust gas aftertreatment device is provided in an engine compartment that is adjacent to a cooling fan through which cooling air is supplied to a heat exchanger. The exhaust gas aftertreatment device includes a selective catalytic reduction device in which ammonia obtained from a urea aqueous solution is used as a reduction-causing agent. A urea aqueous solution pipe through which the urea aqueous solution is supplied is laid to the selective catalytic reduction device through the engine compartment. In the engine compartment, a pipeline-forming member having pipelines in which the urea aqueous solution pipe is installed. The cooling air sucked by a cooling fan flows into the pipelines.

4 Claims, 6 Drawing Sheets

(51) Int. Cl.

| | | |
|---|---|---|
| *B01D 53/94* | (2006.01) | |
| *F01N 3/02* | (2006.01) | |
| *F01N 3/20* | (2006.01) | |
| *B01D 53/90* | (2006.01) | |
| *E02F 9/08* | (2006.01) | |
| *F01P 11/10* | (2006.01) | |
| *F01N 13/00* | (2010.01) | |
| *F28D 9/00* | (2006.01) | |
| *F01N 13/14* | (2010.01) | |
| *F01P 1/00* | (2006.01) | |

(52) U.S. Cl.
CPC ............ *E02F 9/0858* (2013.01); *E02F 9/0866* (2013.01); *F01N 3/0205* (2013.01); *F01N 3/2066* (2013.01); *F01P 11/10* (2013.01); *B01D 53/9431* (2013.01); *B01D 2251/2067* (2013.01); *F01N 3/055* (2013.01); *F01N 13/001* (2013.01); *F01N 13/143* (2013.01); *F01N 2260/022* (2013.01); *F01N 2470/08* (2013.01); *F01N 2590/08* (2013.01); *F01N 2610/02* (2013.01); *F01N 2610/11* (2013.01); *F01N 2610/14* (2013.01); *F01P 2001/005* (2013.01); *F28D 9/0043* (2013.01); *Y02T 10/24* (2013.01)

(56) References Cited

U.S. PATENT DOCUMENTS

| | | | |
|---|---|---|---|
| 2007/0092413 A1 | 4/2007 | Hirata et al. | |
| 2008/0092531 A1 | 4/2008 | Suzuki et al. | |
| 2009/0151335 A1 | 6/2009 | Hirata et al. | |
| 2009/0293460 A1 | 12/2009 | Hirata et al. | |
| 2010/0186381 A1 | 7/2010 | Charles et al. | |
| 2011/0133127 A1* | 6/2011 | Kwan | B01D 53/9431 252/374 |
| 2011/0239980 A1 | 10/2011 | Batzold et al. | |
| 2012/0048631 A1 | 3/2012 | Shatters et al. | |
| 2013/0014496 A1* | 1/2013 | Fogg | F01N 3/2066 60/320 |
| 2013/0291523 A1* | 11/2013 | Shah | F01N 3/2066 60/287 |
| 2013/0294876 A1* | 11/2013 | Kobayashi | E02F 9/0866 414/744.2 |

FOREIGN PATENT DOCUMENTS

| | | |
|---|---|---|
| JP | 04118133 U | 10/1992 |
| JP | 06018619 U | 3/1994 |
| JP | 2002503783 A | 2/2002 |
| JP | 2002221110 A | 8/2002 |
| JP | 2003020936 A | 1/2003 |
| JP | 2005127318 A | 5/2005 |
| JP | 2007283801 A | 11/2007 |
| JP | 2008101535 A | 5/2008 |
| JP | 2008156835 A | 7/2008 |
| JP | 2008240678 A | 10/2008 |
| JP | 2008303786 A | 12/2008 |
| JP | 2009117127 A | 5/2009 |
| JP | 2010261373 A | 11/2010 |
| JP | 2010285814 A | 12/2010 |
| JP | 2011214580 A | 10/2011 |
| JP | 2012082796 A | 4/2012 |
| WO | 2012027210 A2 | 3/2012 |

OTHER PUBLICATIONS

Japanese Office Action (and English translation thereof) dated Jun. 2, 2015, issued in counterpart Japanese Application No. 2012-235913.
International Preliminary Report on Patentability (IPRP) dated Apr. 28, 2015 issued in International Application No. PCT/JP2013/073945.
International Search Report (ISR) dated Oct. 22, 2013 issued in International Application No. PCT/JP2013/073945.
Japanese Office Action dated Aug. 5, 2014 issued in counterpart Japanese Application No. 2012-235913.
Extended European Search Report dated Sep. 25, 2015, issued in counterpart European Application No. 13849921.5.

* cited by examiner

COOLING STRUCTURE FOR UREA AQUEOUS SOLUTION CONDUIT

TECHNICAL FIELD

The present invention relates to improvement in a cooling structure of a urea aqueous solution pipe.

BACKGROUND ART

It has been known that particulate matters (PM) contained in exhaust gas discharged from an internal combustion engine (e.g., a diesel engine) are collected by a dedicated filter (i.e., Diesel Particulate Filter (DPF)). Since the regulation for the exhaust gas has become stricter recently, further purification of the exhaust gas is desired. Accordingly, an exhaust gas aftertreatment device desirably includes a reduction-causing catalyst that purifies nitrogen oxides in the exhaust gas in addition to the DPF.

A reduction-causing agent in a form of ammonia obtained from a urea aqueous solution is used for such a reduction-causing catalyst Ammonia in a state of a urea aqueous solution is pumped from a tank to an injector and injected from the injector into an exhaust pile (a mixing pipe) on an upstream of the reduction-causing catalyst. The injected urea aqueous solution is thermally decomposed by the heat of the exhaust gas and ammonia obtained by the thermal decomposition is supplied to the reduction-causing catalyst.

The urea aqueous solution accumulated in the tank is pumped to the injector through a urea aqueous solution pipe. Since such a urea aqueous solution pipe is installed in an engine compartment, the urea aqueous solution may be deteriorated by thermal influence from the engine. Particularly, in some working vehicles, an inside of an exterior cover is divided into an engine compartment and a heat exchanger compartment in which a radiator and the like are arranged. In such a case, a cooling air supplied from a cooling fan to the radiator and the like does not flow into the engine compartment. Consequently, a temperature of the engine compartment is further significantly increased, whereby acceleration of deterioration is concerned.

For this reason, it has been typically proposed to provide a cooler in a supply pipe or a return pipe that returns the urea aqueous solution from the injector to the tank (see, for instance, FIGS. 1 and 2 of Patent Literature 1).

CITATION LIST

Patent Literature(S)

Patent Literature 1: JP-A-2011-214580

SUMMARY OF INVENTION

Problems to be Solved by the Invention

However, when the cooler is provided to the supply pipe or the return pipe as described in Patent Literature 1, the structure of the pipes becomes complicated and a production cost becomes high.

Alternatively, it may be possible to enlarge an opening area of an inlet through which the cooling air flows into the engine compartment, thereby supplying a large volume of the cooling air into the engine compartment to enhance cooling performance of the supply pipe. However, when the opening area of the inlet is enlarged, noise to the environment becomes unfavorably large.

An object of the invention is to provide a cooling structure of a urea aqueous solution pipe producible at a reduced cost and capable of reliably suppressing deterioration of a urea aqueous solution and preventing noise to the environment.

Means for Solving the Problems

According to a first aspect of the invention, in a cooling structure of a urea aqueous solution pipe laid to a selective catalytic reduction device in an exhaust gas aftertreatment device, the exhaust gas aftertreatment device being provided in an engine compartment that is adjacent to a cooling fan through which cooling air is supplied to a heat exchanger, the selective catalytic reduction device using ammonia obtained from a urea aqueous solution is used as a reduction-causing agent, the urea aqueous solution pipe supplying the urea aqueous solution to the selective catalytic reduction device through the engine compartment, the cooling structure includes: a pipeline-forming member provided in the engine compartment and including a pipeline in which the urea aqueous solution pipe is arranged, in which the cooling air sucked by the cooling fan flows in the pipeline.

According to a second aspect of the invention, in a cooling structure of a urea aqueous solution pipe laid to a selective catalytic reduction device in an exhaust gas aftertreatment device, the exhaust gas aftertreatment device being provided in an engine compartment to which a cooling fan is provided, the selective catalytic reduction device using ammonia obtained from a urea aqueous solution as a reduction-causing agent, the urea aqueous solution pipe supplying the urea aqueous solution to the selective catalytic reduction device through the engine compartment, the cooling structure includes: a pipeline-forming member provided in the engine compartment and including a pipeline in which the urea aqueous solution pipe is arranged, in which insulation space is juxtaposed with the pipeline-forming member, and cooling air sucked by the cooling fan flows in at least one of the pipeline and the insulation space.

According to a third aspect of the invention, in a cooling structure of a urea aqueous solution pipe laid to a selective catalytic reduction device in an exhaust gas aftertreatment device, the exhaust gas aftertreatment device being provided in an engine compartment to which a cooling fan is provided, the selective catalytic reduction device using ammonia obtained from a urea aqueous solution as a reduction-causing agent, the urea aqueous solution pipe supplying the urea aqueous solution to the selective catalytic reduction device through the engine compartment, the cooling structure includes: a pipeline-forming member provided in the engine compartment and including a pipeline in which the urea aqueous solution pipe is arranged, in which insulation space is juxtaposed with the pipeline-forming member, and cooling air sucked by the cooling fan flows in the pipeline and the insulation space.

In the cooling structure of the urea aqueous solution pipe according to a fourth aspect of the invention, the pipeline-forming member is close to or in contact with an inside of an exterior cover with which the engine compartment is covered, and the exterior cover includes an air intake hole through which the pipeline intercommunicates with an outside of the engine compartment.

In the cooling structure of the urea aqueous solution pipe according to a fifth aspect of the invention, a portion of the exterior cover under which the pipe line-forming member is positioned is detachable from the rest of the exterior cover, and the pipeline-forming member is attached to the rest of the exterior cover.

According to the first aspect of the invention, the pipeline-forming member is provided in the engine compartment and the urea aqueous solution pipe is arranged in the pipeline of the pipeline-forming member while the cooling air flows in the pipeline. Accordingly, without using typical complicated device and structure, the urea aqueous solution pipe can be effectively cooled, whereby deterioration of the urea aqueous solution is reliably suppressible at a low production cost. Moreover, since an air intake hole having a large opening area for intercommunication between the engine compartment and the outside is not necessary, noise to the environment is also reducible.

According to the second and third aspects of the invention, the pipeline-forming member has the insulation space in addition to the structure of the first aspect of the invention. Accordingly, by flowing the cooling air into the insulation space and/or the pipeline, the same effects as those in the first aspect of the invention is obtainable to achieve an object of the invention.

According to the fourth aspect of the invention, outer air can reliably flow into the pipeline-forming member through the air intake hole provided on the exterior cover. In this arrangement, the outside (an outside of the engine compartment) and the pipeline-forming member intercommunicate with each other through the air intake hole. In other words, since the inside and the outside of the engine compartment do not intercommunicate with each other through the air intake hole, there is no fear of increasing noise.

According to the fifth aspect of the invention, the portion of the exterior cover under which the pipeline-forming member is provided is openable and closeable and the pipeline-forming member is attached to a portion of the exterior cover other than the portion under which the pipeline-forming member is provided. Accordingly, even when the above portion of the exterior cover is opened, the urea aqueous solution pipe is not drawn out of the engine compartment together with the pipeline-forming member, so that maintenance of the pipeline-forming member left in the engine compartment and the urea aqueous solution pipe laid in the pipeline-forming member can be easily performed.

DESCRIPTION OF EMBODIMENT(S)

An exemplary embodiment of the invention will be described below with reference to the drawings.

Figure 1:
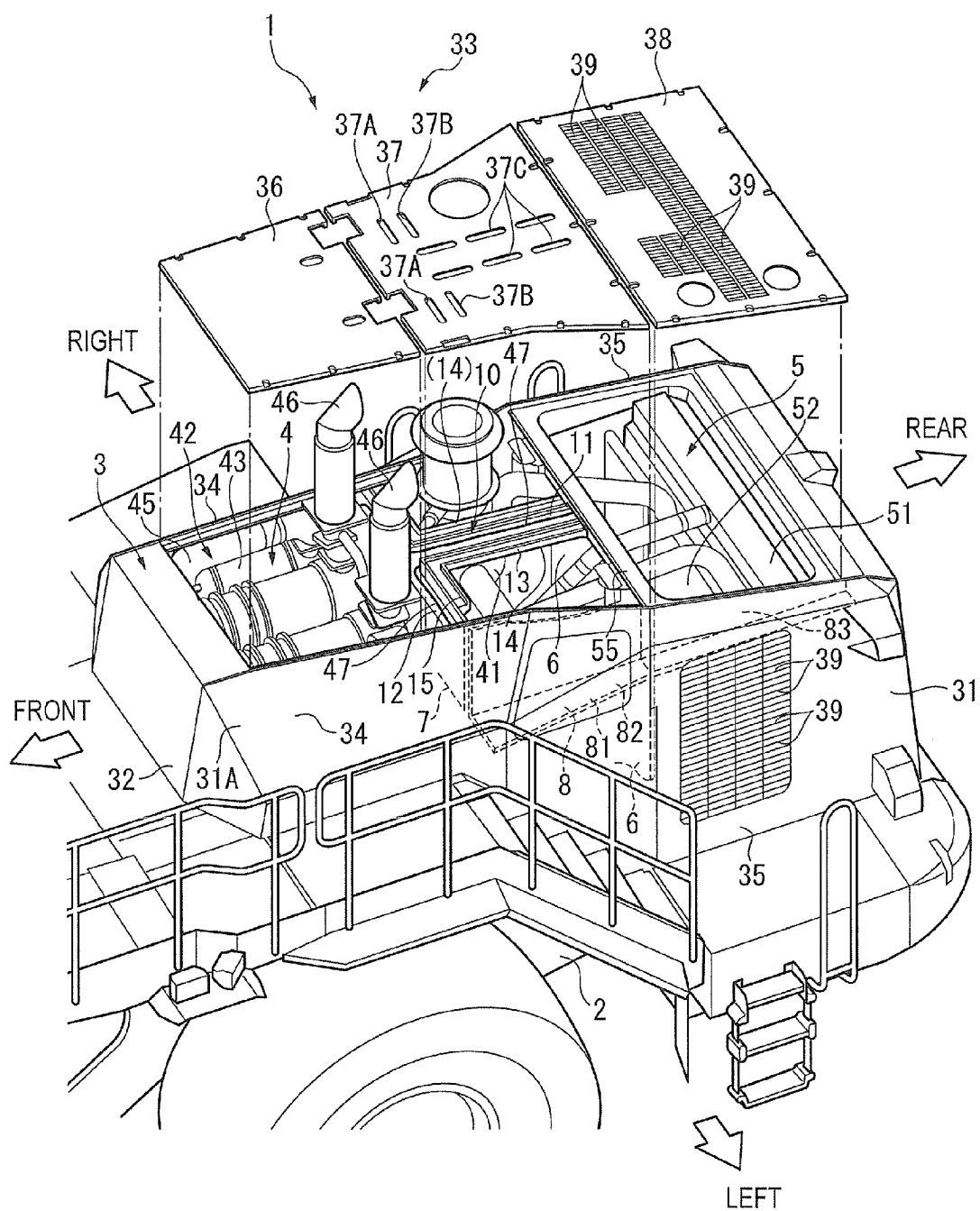
FIG. 1 is an exploded perspective view showing a part of a working vehicle provided with a cooling structure of a urea aqueous solution pipe according to an exemplary embodiment of the invention.

FIG. 1 is an exploded perspective view showing a part of a working vehicle 1 provided with a cooling structure of an engine compartment 4 according to the exemplary embodiment of the invention.

Description of Overall Vehicle

In FIG. 1, the working vehicle 1 is in a form of a wheel loader including a front frame (not shown) and a rear frame 2 connected to the front frame in a manner capable of being articulated. Working equipment that includes a boom, a bell crank, a bucket and hydraulic actuators that actuate the boom, bell crank and the bucket is provided on the front frame of the working vehicle 1. It should be noted that an illustration and a description of the working equipment are omitted since the working equipment is not directly relevant to the invention.

On the rear frame 2 of the working vehicle 1 and behind a cab (not shown), the engine compartment 4 and a heat exchanger compartment 5 which are covered with an exterior cover 3 are juxtaposed in a front-rear direction. The engine compartment 4 and the heat exchanger compartment 5 are separated from each other by a first partitioning wall 6. The first partitioning wall 6 vertically separates the engine compartment 4 from the heat exchanger compartment 5. A periphery of the first partitioning wall 6 is close to or in contact with an inner surface of the exterior cover 3.

The exterior cover 3 is attached via a support frame that stands on the rear frame 2, and the like. Specifically, the exterior cover 3 includes: side covers 31, 31 that respectively form right and left side walls of the engine compartment 4 and the heat exchanger compartment 5, a front cover 32 that forms a front-side wall of the engine compartment 4, a rear grill (not shown) that is openably/closeably attached to a frame 56 (see FIG. 4) in a rear portion of the heat exchanger compartment 5, and a hood 3 that forms a ceiling of the engine compartment 4 and the heat exchanger compartment 5.

The side cover 31 has a first side cover 34 in front of the first partitioning wall 6 and a second side cover 35 behind the first partitioning wall 6.

The hood 33 has a first upper cover 36 with which a front portion of the engine compartment 4 is covered, a second upper cover 37 with which a rear portion of the engine compartment 4 is covered, and a third upper cover 38 with which the entire heat exchanger compartment 5 is covered. The first to third upper covers 36 to 38 are detachably attached to the side cover 31, the front cover 32 and the like by an appropriate fastening means (e.g., a bolt).

The engine compartment 4 houses: an engine (not shown) mounted on the rear frame 2; an exhaust turbocharger 41, an EGR device, and an exhaust gas aftertreatment device 42 which are installed in the engine, pipes of these components and other auxiliary devices. The engine compartment 4 is divided into a front section and a rear section by a second partitioning wall 7 above the engine. Specifically, right and left side ends of the second partitioning wall 7 are close to or in contact with a vertical surface of a later-described ventilation duct 8 while a top end of the second partitioning wall 7 is close to or in contact with a lower surface of the second upper cover 37, whereby the compartment 4 is divided into the front section and the rear section.

However, since a lower end of the second partitioning wall 7 does not reach right and left sides of the engine, the front section and the rear section of the compartment 4 intercommunicate with each other under the second partitioning wall 7. The exhaust gas aftertreatment device 42 is disposed in a space in front of the second partitioning wall 7 while the other devices including the exhaust turbocharger 41 are disposed in a space behind the second partitioning wall 7.

Figure 3:
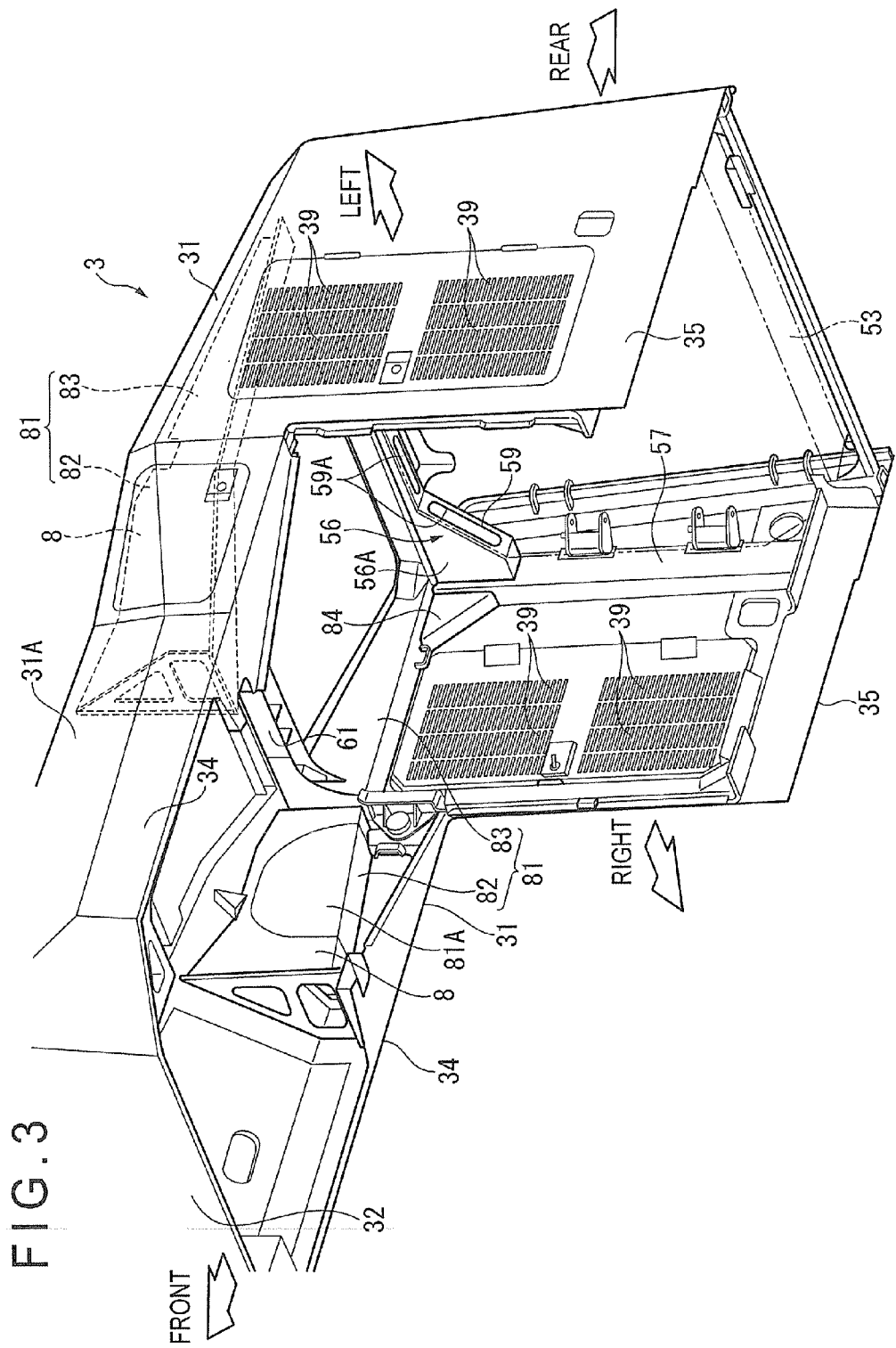
FIG. 3 is a perspective view showing a principal part of the ventilation structure of the engine compartment, seen from an obliquely lower side.

The heat exchanger compartment 5 houses a radiator 51 that cools an engine cooling water, an after-cooler 52 that cools intake air (supplied air) supercharged by the exhaust turbocharger 41, a fan shroud 53 (FIG. 3) disposed behind the radiator 51, an electric or hydraulic cooling fan 54 (FIG. 3)

that is rotated with a part partially projecting beyond the fan shroud 53, and pipes of the components 51 to 54. Alternatively, a capacitor for an air conditioner, which is to be provided in the cab, may be provided in the heat exchanger compartment 5.

A rectangular frame plate 55 in a planar view is provided over the heat exchanger compartment 5. The third upper cover 38 is attached over the frame plate 55. The pipes of the radiator 51 and the after-cooler 52 penetrate the first partitioning wall 6 to be laid in the heat exchanger compartment 5 and the engine compartment 4. The cooling fan 54 is pivotally movable in a rear direction along with a frame that supports the cooling fan 54 in the same manner as the rear grill. By pivotally moving the cooling fan 54 so that the cooling fan 54 is separated from a radiation surface of the radiator 51, maintenance for clogging and the like of the radiator 51 can be performed.

When the cooling fan 54 is rotated, outer air (cooling air) flows into the heat exchanger compartment 5 through inlets 39 provided on the side cover 31 and the third upper cover 38 and a gap formed in the rear frame 2 under the heat exchanger compartment 5. The inflow cooling air passes through the after-cooler 52 and the radiator 51, thereby cooling the intake air and the engine cooling water. Subsequently, the cooling air is discharged from the rear grill through the cooling fan 54.

On the other hand, when the cooling fan 54 is driven, air in the engine compartment 4 is forcibly sucked toward the cooling fan 54 through the ventilation duct 8 defining the ventilation structure of the invention and is discharged from the rear grill through the cooling fan 54. While the air in the engine compartment 4 is kept being sucked, outer air (fresh air for ventilation) flows into the engine compartment 4 through the gap of the rear frame 2 under the engine compartment 4 to be sucked through the ventilation duct 8. This operation is repeated for ventilation of the engine compartment 4.

Figure 2:
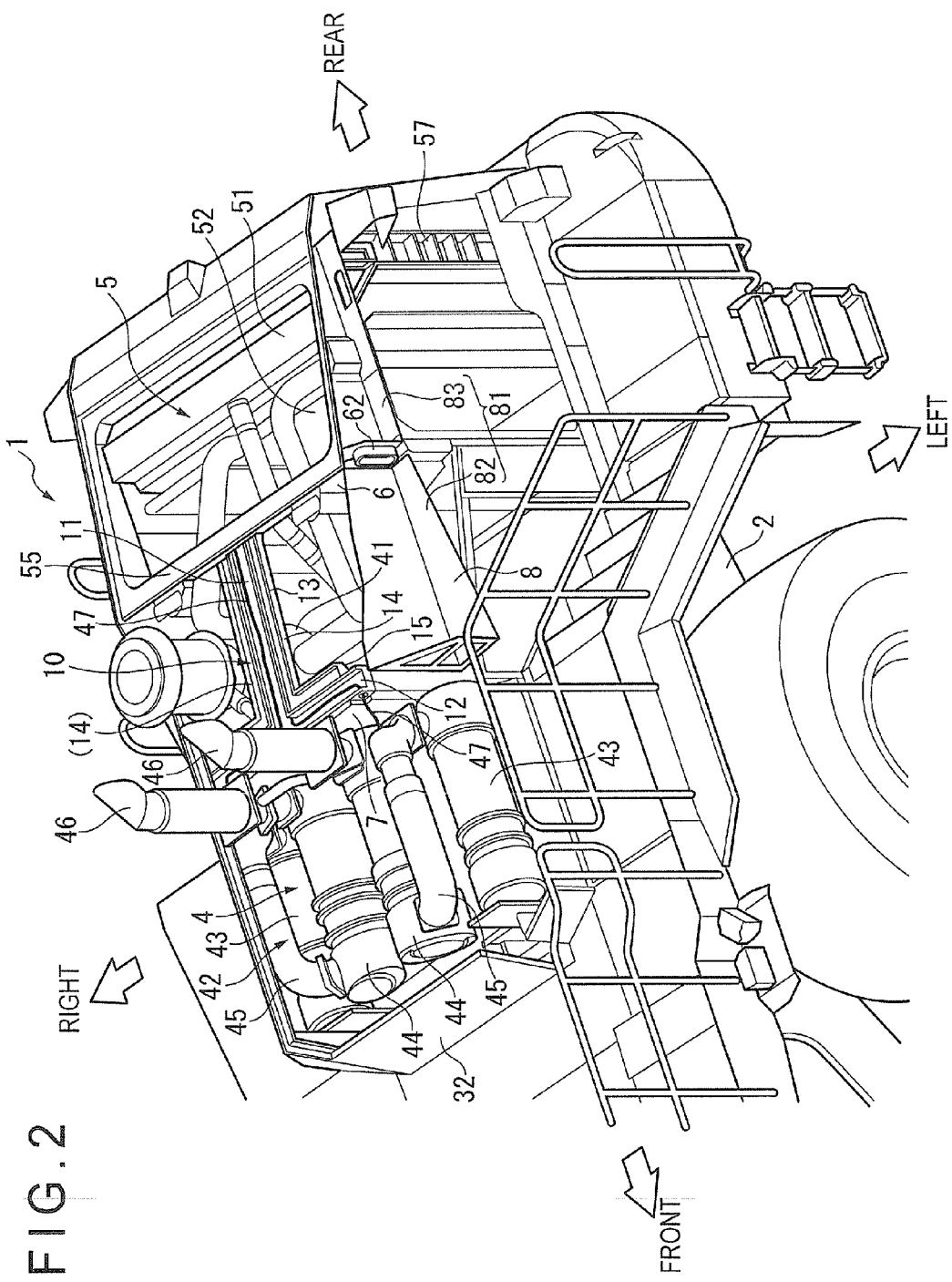
FIG. 2 is a perspective view showing the ventilation structure of the engine room.

FIG. 2 is a perspective view showing the ventilation structure of the engine compartment 4. FIG. 2 also shows a cooling structure of the urea aqueous solution pipe 47 connected to the exhaust gas aftertreatment device 42.

Herein, the exhaust gas aftertreatment device 42 includes: a pair of DPF (Diesel Particulate Filter) devices 43, 43 disposed on both right and left sides of the front section of the engine compartment 4; and SCR (Selective Catalytic Reduction) devices 44, 44 juxtaposed in a right-left direction between the DPF devices 43, 43.

An exhaust pipe connected to a turbine outlet of the exhaust turbocharger 41 is laid to a side of the engine compartment 4 to extend near the front of the engine, where an end of the exhaust pipe is bifurcated. A first portion of the bifurcated exhaust pipe is connected to a front portion of the DPF device 43 disposed to the left of the engine compartment 4. Exhaust gas flows into the DPF device 43 through the first portion. The inflow exhaust gas flows in the rear direction through the cylindrical DPF device 43 provided in the front-rear direction of the vehicle. Particulate matters are collected by an internal filter of the DPF device 43. Subsequently, the inflow exhaust gas flows into a mixing pipe 45 connected to a rear portion of the DPF device 43.

The mixing pipe 45 extends in a front direction and an end of the mixing pipe 45 is connected to a front portion of the left one of the SCR devices 44. In other words, the exhaust gas flows in the front direction through the mixing pipe 45. In this arrangement, an injector for injecting a urea aqueous solution is attached to a base end (near the DPF device 43) of the mixing pipe 45. The urea aqueous solution injected from the injector into the mixing pipe 45 is thermally decomposed into ammonia by heat of the exhaust gas. The ammonia flows into the SCR device 44 along with the exhaust gas.

The inflow exhaust gas and ammonia in the SCR device 44 flow in the rear direction through the cylindrical SCR device 44 in the front-rear direction of the vehicle and are supplied to a reduction-causing catalyst in the SCR device 44, thereby purifying nitrogen oxides in the exhaust gas. The exhaust gas in which nitrogen oxides are purified is discharged to the outside from the tail pipe 46 connected to a rear portion of the SCR device 44.

A second portion of the bifurcated exhaust pipe passes in front of the engine to extend to the right of the engine and is connected to the front portion of the DPF device 43 disposed to the right of the engine. Herein, subsequent flow and aftertreatment of the exhaust gas flowing into the DPF device 43 are the same as those in the DPF device disposed to the left of the engine compartment 4 and can be understood from the above description. Accordingly, the description herein is omitted.

In the exhaust gas aftertreatment device 42 according to the exemplary embodiment, the pair of SCR devices 44, 44 are disposed at the center over the engine. The DPF devices 43, 43 are respectively positioned at both shoulders of the engine at a level lower than the SCR devices 44, 44. Accordingly, the side cover 31 shown in FIG. 1 has a slant surface 31A that is slant downward from the center of the vehicle on the right and left sides of the vehicle at the areas corresponding to the positions of the disposed DPF device 43 and SCR device 44. With the slant surface 31A, visibility of right and left sides of the rear portion of the vehicle from the cab is improved.

Description of Ventilation Structure of Engine Compartment

In FIGS. 1 and 2, inside each of the right and left side covers 31, the ventilation duct 8 is provided approximately from the middle of the engine compartment 4 to the rear portion of the heat exchanger compartment 5. The aforementioned slant surface 31A is provided in the front-rear direction on an upper portion of each of the side covers 31. A reinforcing member 81 is attached to an inner surface of each of the side covers at a position substantially corresponding to the slant surface 31A. In FIG. 2, in order to show the reinforcing member 81 by a solid line, the reinforcing member 81 is removed from each of the side covers 31 for convenience.

The reinforcing member 81 is intended to improve rigidity of each of the side covers 31 and includes: a first reinforcing member 82 that is provided to the first side cover 34 to be positioned in the engine compartment 4; and a rear-positioned second reinforcing member 83 that is provided to the second side cover 35 to be positioned in the heat exchanger compartment 5. The first and second reinforcing members 82 and 83 are shaped in an L-cross section. The ventilation duct 8 is formed using an inner surface (a surface facing the side cover 31) of the reinforcing member 81 and an inner surface of the side cover 31. The formed internal space functions as an air passage of the ventilation duct 8.

The first and second reinforcing members 82 and 83 are separated from each other by a bridging frame 61 (also see FIGS. 3 and 4) that bridges the right and left second side covers 31 (the second reinforcing members 83). Accordingly, each of the ventilation ducts 8 is divided in the middle of the front-rear direction by an end of the bridging frame 61. However, a communicating portion 62 is provided at the divided portion, so that air securely flows between the first and second reinforcing members 82 and 83. The bridging frame 61 is provided at a position corresponding to an upper portion of the first partitioning wall 6. An upper surface of the bridging frame 61 supports a frame on the front side of the frame plate 55.

A front end of the ventilation duct 8 is positioned near the second partitioning wall 7 of the engine compartment 4 and is open toward the exhaust gas aftertreatment device 42 disposed in front of the second partitioning wall 7. Into the ventilation duct 8, not only air heated by heat of the engine but also air heated by heat of the exhaust gas aftertreatment device 42 are forcibly sucked. Moreover, into the ventilation duct 8, air heated by the engine and the exhaust turbocharger 41 is also sucked from the space behind the second partitioning wall 7 through under the second partitioning wall 7.

In this arrangement, a cross-sectional area of the air passage of the ventilation duct 8 is gradually reduced from the front end to the rear end of the ventilation duct 8. In other words, the ventilation duct 8 is in a tapered shape. Accordingly, at the rear end having a reduced cross-sectional area, a negative pressure generated by rotation of the cooling fan 54 can favorably work. Moreover, pressure gradient can be formed in a long region extending over the ventilation duct 8 in the front-rear direction. Consequently, air in the engine compartment 4 can be reliably sucked in the rear direction.

Figure 4:
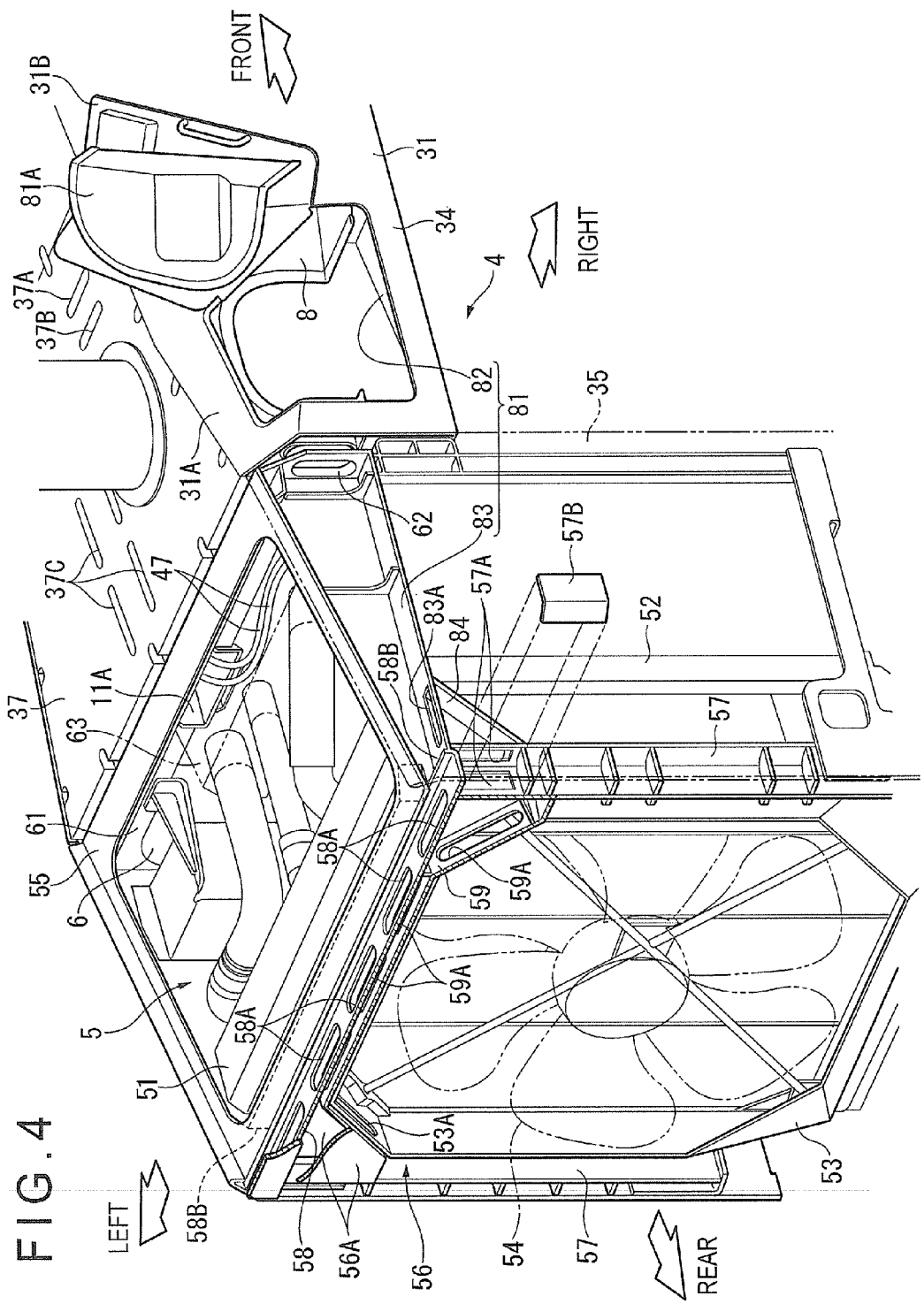
FIG. 4 is a perspective view showing the principal part of the ventilation structure of the engine compartment.

FIG. 3 is a perspective view showing the exterior cover 3 seen from a lower side, in which the ventilation structure of the invention is provided. FIG. 4 is a perspective view showing a principal part of the ventilation structure seen from the rear. It should be noted that the first and second partitioning walls 6 and 7 are not shown in FIG. 3 and the second partitioning wall 7 is not shown in FIG. 4.

In FIGS. 3 and 4, a portal frame 56 standing on the rear frame 2 (FIGS. 1 and 2) is attached to a rear end of the exterior cover 3. The portal frame 56 includes: a pair of right and left vertical frames 57, 57 that are respectively attached to vertical rear ends of the second side covers 35; a horizontal frame 58 that bridges top ends of the vertical frames 57, 57; and an intermediate frame 59 that is provided under the horizontal frame 58 and bridges the vertical frames 57, 57.

Each of the vertical frames 57 has an L-shaped cross section and stands with a corner facing an inside of the vehicle. A communication opening 57A is provided in each of pieces forming the L shape of an upper portion of the vertical frame 57. The portion of each of the vertical frames 57 in which the communication openings 57A are provided is covered with vertical ribs and a cover 57B to be laterally welded or the like.

The horizontal frame 58 is provided by a channel member having a concave cross section and is set with an opening facing upward. The upward opening of the horizontal frame 58 is covered with a third upper cover 38, whereby the horizontal frame 58 functions as an air passage in the right and left direction. A plurality of communication openings 58A are provided in the longitudinal direction on a bottom of the horizontal frame 58. Moreover, a cutout 58B is provided by cutting out each longitudinal end of a front web of the horizontal frame 58. The cutout 58B is connected with a rear end of the second reinforcing member 83 forming the reinforcing member 81, through which the ventilation duct 8 intercommunicates with the air passage in the horizontal frame 58.

The intermediate frame 59 is formed in an elongated plate. Both longitudinal sides of the intermediate frame 59 are bent downward and bonded to the vertical frames 57. Also in the intermediate frame 59, communication openings 59A similar to the communication opening 58A are provided at positions each substantially corresponding to the communication opening 58A of the horizontal frame 58.

A space surrounded by the upper portions of the vertical frames 57, the horizontal frame 58, and the intermediate frame 59 is covered with plates 56A on front and back sides of the space. The space covered with the plates 56A intercommunicates with the upper air passage through the communication openings 58A of the horizontal frame 58 while communicating with an inner space surrounded by the portal frame 56 through the communication openings 59A of the intermediate frame 59. Accordingly, the ventilation duct 8 intercommunicates with the inner space of the portal frame 56 through the space surrounded by the frames 57 to 59.

Moreover, substantially triangular spaces defined by each of the inclined sides of the intermediate frame 59 intercommunicate with spaces covered with the covers 57B in the upper portions of the vertical frames 57 through a first one of the communication openings 57A provided in each of the vertical frames 57. Further, a communication opening 83A is provided on the bottom of each of the second reinforcing members 83. A corner member 84 is provided at a corner formed by each of the vertical frames 57 and each of the second reinforcing members 83 so that a second one of the communication openings 57A and the communication opening 83A are covered with the corner member 84. Accordingly, the ventilation duct 8 also intercommunicates with the inner space of the portal frame 56 through the spaces surrounded by each of the corner members 84, the upper portion of each of the vertical frames 57 and the frames 57 to 59.

The fan shroud 53, which is a substantially octagonal frame, is housed in the inner space of the portal frame 56. The cooling fan 54 is rotated inside the fan shroud 53. An upper portion of the fan shroud 53 is close to the intermediate frame 59. Communication openings 53A are provided in the upper portion of the fan shroud 53 in a manner to correspond to each of the communication openings 59A of the intermediate frame 59. In other words, the communication openings 53A are open toward a surrounding area of the cooling fan 54, more specifically, toward a position that is adjacent to a rotation track of the outermost periphery of the cooling fan 54 and where a negative pressure is generated by the rotation of the cooling fan 54.

As described above, the ventilation structure of the engine compartment according to the exemplary embodiment is provided so that the negative-pressure generating part within the fan shroud 53 intercommunicates with the engine compartment 4 through the fan shroud 53, the inside of the portal frame 56 surrounding the fan shroud 53, and the ventilation duct 8 integrated with the exterior cover 3. FIG. 4 shows an open state of the inspection hatch 31B that is openably and closeably provided to the right side cover 31. The part of each of the reinforcing members 81 (the first reinforcing member 82) corresponding to the inspection hatch 31 defines an opening/closing portion 81A that is openable/closeable integrally with the inspection hatch 31.

According to the exemplary embodiment, when the cooling fan 54 is driven, a negative pressure generated by the driving of the cooling fan 54 causes air that is closer to a negative-pressure-generated part (e.g., the air in the portal frame 56) to start being sucked, so that the air in the engine compartment 4 is gradually sucked into the ducts 8. The sucked air passes through the ventilation ducts 8, which means the air flows in the rear direction bypassing the heat exchanger compartment 5. Since each of the ventilation ducts 8 is shielded from the heat exchanger compartment 5, air does not flow into the ventilation ducts 8 from the heat exchanger compartment 5, but the air in the engine compartment 4 is reliably sucked through the ventilation ducts 8.

The air flowing through the ventilation duct 8 partially flows into the horizontal frames 58 of the portal frame 56 from the rear end of each of the ventilation ducts 8 and is drawn inside the fan shroud 53 through the space surrounded by the frames 57 to 59. Moreover, the rest of the air flowing through the ventilation ducts 8 flows into the upper portion of each of the vertical frames 57 of the portal frame 56 from the rear end of the ventilation ducts 8 through the corner members 84 and is simultaneously drawn inside the fan shroud 53 through the space surrounded by the frames 57 to 59.

The drawn air is discharged outside by the rotation of the cooling fan 54. A volume equivalent to that of the air discharged from the engine compartment 4 is drawn in as fresh air from the outside through under the engine compartment 4 and is again sucked from the ventilation ducts 8. This operation is repeated for ventilation of the engine compartment 4. With this arrangement, even when the exhaust gas aftertreatment device 42 is disposed within the engine compartment 4, an excessive increase in temperature of the engine compartment can be reliably inhibited.

Cooling Structure of Urea Aqueous Solution Pipe

As shown in FIG. 2, an injector (not shown) is attached to a rear portion of the mixing pipe 45 of the exhaust gas aftertreatment device 42. The urea aqueous solution pipe 47 is connected to the injector. The urea aqueous solution pipe 47 extends from a urea aqueous solution tank set under the heat exchanger compartment 5 into the engine compartment 4 through the heat exchanger compartment 5 to be connected to the injector. In the heat exchanger compartment 5, a supply module is provided in the course of the urea aqueous solution pipe 47. With the supply module, the urea aqueous solution is pumped from the urea aqueous solution tank to the injector through the urea aqueous solution pipe 47.

Figure 5:
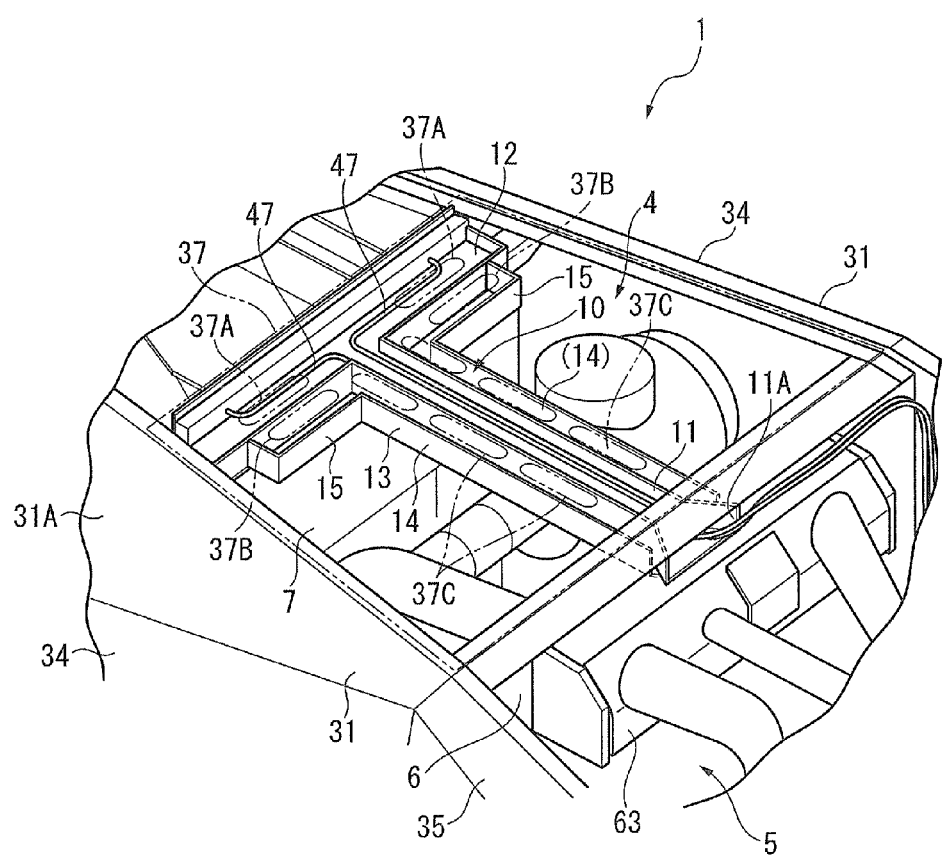
FIG. 5 is a perspective view showing the cooling structure of the urea aqueous solution pipe of the working vehicle.
Figure 6:
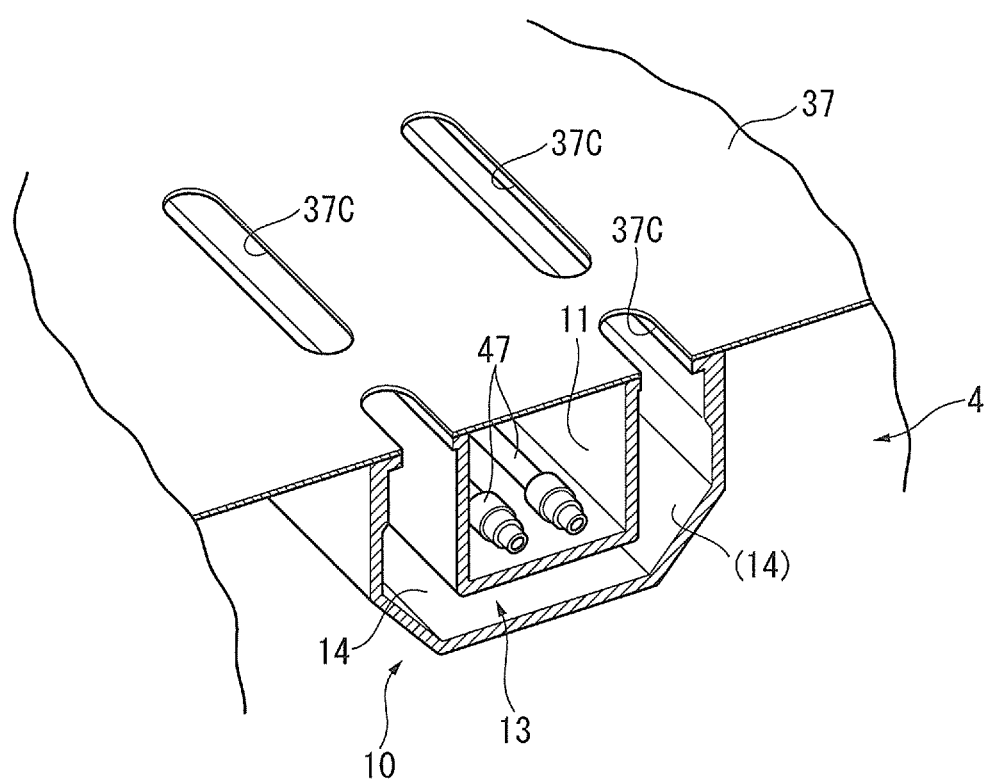
FIG. 6 is a cross-sectional perspective view showing a principal part of the cooling structure of the urea aqueous solution pipe.

FIG. 5 is a perspective view showing the cooling structure in the exemplary embodiment. FIG. 6 is a cross-sectional perspective view showing a principal part of the cooling structure.

In FIGS. 5 and 6, a pipeline-forming member 10 in which the urea aqueous solution pipe 47 is installed is provided on the rear of the second partitioning wall 7 in the engine compartment 4. The pipeline-forming member 10 is provided immediately under the second upper cover 37 of the hood 33 and in contact with the lower surface of the second upper cover. The pipeline-forming member 10, which is formed in a T-shape in a planar view, includes a pipeline in a form of a first pipeline 11 that extends in the front-rear direction and a pipeline in a form of a second pipeline 12 that extends in the right-left direction. The first and second pipelines 11 and 12 are each a cross-sectionally concaved groove having partitioning walls with an opening upward. A rear end of the first pipeline 11 penetrates the first partitioning wall 6 and is enlarged in a funneled shape to be open as an opening 11A in the heat exchanger compartment 5.

In the exemplary embodiment in which two mixing pipes 45 are provided on the right and left sides, two urea aqueous solution pipes 47 are used when installed in the pipeline-forming member 10. The two urea aqueous solution pipes 47 after passing through the heat exchanger compartment 5 are installed from the opening 11A through the first pipeline 11 and divided into right and left portions of the second pipeline 12. Each of the urea aqueous solution pipes 47 penetrates the second partitioning wall 7 from each end of the second pipeline 12 to extend to the front section in front of the second partitioning wall 7 to be connected to the injector.

The pipeline-forming member 10 further includes an air passage 13 (insulation space) in a T-shape in a planar view which is adjacent to the first and second pipelines 11 and 12. The air passage 13 includes first passages 14 that are laterally juxtaposed with the first pipeline 11 and second passages 15 that are juxtaposed at the rear of the second pipeline 12. The first and second passages 14 and 15 are also open upward.

The first passages 14 are defined by the partitioning walls of the first pipeline 11 and outer partitioning walls that cover the partitioning walls of the first pipeline 11. Cooling air flows through space between the inner and outer partitioning walls as described later. The first passages 14 are present under the first pipeline 11 in a cross-sectional view. In other words, the sides and the bottom of the first pipeline 11 are covered with the first passages 14 in a cross-sectional view.

The respective rear ends of the first passages 14 penetrate the first partitioning wall 6 to be open in the heat exchanger compartment 5. The respective openings of the first passages 14 face a bracket 63 that supports the pipes in the heat exchanger compartment 5. The bracket 63 is attached to the partitioning wall 6 while being open downward. Each of the second passages 15 is a cross-sectionally concaved groove having partitioning walls and is attached to a side of the second pipeline 12.

A rear end of the aforementioned pipeline-forming member 10 is supported by the first partitioning wall 6 while a front end of the pipeline-forming member 10 is supported by the right and left side covers 31 through an appropriate bracket. The upward opening of the pipeline-forming member 10 is covered with the second upper cover 37. By covering the upward opening, the first and second pipelines 11 and 12 and the first and second passages 14 and 15 are formed in a tunnel.

In this arrangement, the second upper cover 37 includes: a pair of right and left elongated air intake holes 37A, 37A that are positioned above the second pipeline 12; a pair of air intake holes 37B, 37B that are similar to the air intake holes 37A, 37A and are positioned above the second passages 15; and a plurality of air intake holes 37C that are similar to the air intake holes 37A, 37A and are positioned above the first passages 14 in the front-rear direction.

In the pipeline-forming member 10 of which rear end intercommunicates with the heat exchanger compartment 5, when the cooling fan 54 in the heat exchanger compartment 5 is rotated, outer air (cooling air) flows inside through the air intake holes 37A, 37B and 37C of the second upper cover 37.

The cooling air flowing from the air intake holes 37B flows toward the rear through the second pipeline 12 and the first pipeline 11. By this flow of the cooling air, the urea aqueous solution pipes 47 and the first and second pipelines 11 and 12 that house the urea aqueous solution pipes 47 are cooled. The cooling air in this arrangement flows in a direction opposite to the urea aqueous solution flowing through the urea aqueous solution pipes 47. Subsequently, the cooling air flows into the heat exchanger compartment 5 from the enlarged opening 11A.

The cooling air flowing through the air intake holes 37B and 37 flows in the rear direction through the first and second passages 14 and 15 to block heat of the engine and the like in the engine compartment 4 from the first and second pipelines 11 and 12 and the urea aqueous solution pipes 47. Subsequently, the cooling air flows into the heat exchanger compartment 5 from the opening (not shown) provided in the first partitioning wall 6 and is regulated to flow downward by the bracket 63, thereby flowing along the first partitioning wall 6.

The cooling air flowing in the heat exchanger compartment 5 is transferred toward the after-cooler 52 and the radiator 51 along with another cooling air sucked by the cooling fan 54, and subsequently discharged from the rear grill through the cooling fan 54.

According to the cooling structure of the exemplary embodiment, since the urea aqueous solution pipes 47 are arranged within the pipeline-forming member 10 in the engine compartment 4, the urea aqueous solution pipes 47 are forcibly cooled by the cooling air flowing through the pipeline-forming member 10, so that the urea aqueous solution pipes 47 are unlikely to be thermally influenced in the engine compartment 4 to inhibit the urea aqueous solution from being deteriorated. Further, in addition to being shielded from heat by the first and second pipelines 11 and 12, the urea aqueous solution pipes 47 can also be shielded from heat by the cooling air flowing through the first and second passages 14 and 15 outside of the first and second pipelines 11 and 12 and the partitioning walls of the first and second passages 14 and 15, so that the urea aqueous solution pipes 47 are further unlikely to be thermally influenced.

The scope of the invention is not limited to the above-described embodiments, but includes modifications and improvements as long as an object of the invention can be achieved.

For instance, although the pipeline-forming member 10 is provided immediately under the second upper cover 37 of the hood 33 in the above exemplary embodiment, the pipeline-forming member 10 may be provided inside the side cover and the like. In this arrangement, the side cover desirably includes: a hatch openable/closeable against surrounding portions; and a portion of the surrounding portions to which the pipeline-forming member is attached. According to this arrangement, even when the hatch is opened, the pipeline-forming member is not drawn out together with the hatch and maintenance of the urea aqueous solution pipe can be performed while the pipeline-forming member is left in the engine compartment.

In the above exemplary embodiment, the pipeline-forming member 10 is in contact with the lower surface of the second upper cover 37, so that the first and second pipelines 11 and 12 and the first and second passages 14 and 15, which are shaped in a groove, intercommunicate with the outside of the engine compartment 4 through the air intake holes 37A, 37B and 37C of the second upper cover 37. However, in the invention, the pipeline-forming member is not necessarily in contact with the exterior cover (e.g., the second upper cover 37) but may be close to the exterior cover with a predetermined gap.

However, in this arrangement, when only the air intake holes are provided on the exterior cover, there is a possibility that outer air cannot be effectively drawn into the pipelines and the passages even by rotating the cooling fan. Accordingly, it is preferable that the pipelines and the passages are shaped in a tube instead of a groove and a communication portion is preferably provided to the tube for intercommunication of the pipelines and the passages with the air intake holes. In consideration of the detachable exterior cover, such a communication portion is preferably provided to one of the exterior cover and the pipeline-forming member in a detachable manner.

In the above exemplary embodiment, cooling air flows in the first and second pipelines 11 and 12 and the first and second passages 14 and 15 of the pipeline-forming member 10. Even in the arrangement in which the cooling air flows only into the passages, heat from the engine and the exhaust gas aftertreatment device can be insulated from the urea aqueous solution pipe of the pipelines. Accordingly, such an arrangement is also usable. On the contrary, the cooling air may flow only into the pipelines so that the passages function as the insulation space. Even with this arrangement, substantially the same effects are obtainable.

In the above exemplary embodiment, the pipeline-forming member 10 has an air passage consisting of the first and second passages 14 and 15. However, such an air passage may be provided as needed in consideration of the degree of the increase in the temperature of the engine compartment. When the urea aqueous solution pipe is sufficiently cooled by flowing the cooling air only into the pipelines in which the urea aqueous solution pipe is provided, the air passage is not necessarily provided.

The invention claimed is:

1. A cooling structure of a urea aqueous solution pipe laid to a selective catalytic reduction device in an exhaust gas aftertreatment device, the exhaust gas aftertreatment device being provided in an engine compartment that is adjacent to a cooling fan through which cooling air is supplied to a heat exchanger, the heat exchanger being disposed in a heat exchanger compartment, an air in the heat exchanger compartment and the engine compartment being discharged by the cooling fan, the selective catalytic reduction device using ammonia obtained from a urea aqueous solution as a reduction-causing agent, the urea aqueous solution pipe supplying the urea aqueous solution to the selective catalytic reduction device through the engine compartment, the selective catalytic reduction device being disposed above an engine, and the cooling structure comprising:
a pipeline-forming member provided in the engine compartment and comprising a pipeline in which the urea aqueous solution pipe is arranged, the pipeline-forming member being provided at a position proximate to or in contact with an inside of a hood defining a ceiling of the engine compartment; and
an air intake hole that is provided to the hood to intercommunicate the pipeline with an outside of the engine compartment,
wherein:
an end of the pipeline intercommunicates with the heat exchanger compartment,
the urea aqueous solution pipe is disposed in the pipeline from a urea aqueous solution tank set under the heat exchanger compartment through the heat exchanger compartment and an end of the pipeline-forming member, and
the cooling air in a form of an outside air sucked by the cooling fan flows through the air intake hole into the pipeline to be delivered to the heat exchanger compartment to cool the urea aqueous solution pipe.

2. The cooling structure of the urea aqueous solution pipe according to claim 1, wherein:
a portion of the hood under which the pipeline-forming member is positioned is detachable from a remaining portion of the hood, and
the pipeline-forming member is attached to the remaining portion of the hood.

3. A cooling structure of a urea aqueous solution pipe laid to a selective catalytic reduction device in an exhaust gas aftertreatment device, the exhaust gas aftertreatment device being provided in an engine compartment that is adjacent to a cooling fan through which cooling air is supplied to a heat exchanger, the heat exchanger being disposed in a heat exchanger compartment, an air in the heat exchanger compartment and the engine compartment being discharged by the cooling fan, the selective catalytic reduction device using ammonia obtained from a urea aqueous solution as a reduction-causing agent, the urea aqueous solution pipe supplying the urea aqueous solution to the selective catalytic reduction device through the engine compartment, the selective catalytic reduction device being disposed above an engine, and the cooling structure comprising:
a pipeline-forming member provided in the engine compartment and comprising a pipeline in which the urea aqueous solution pipe is arranged and an insulation space juxtaposed with the pipeline, the pipeline-forming member being provided at a position proximate to or in contact with an inside of a hood defining a ceiling of the engine compartment; and an air intake hole that is provided to the hood to intercommunicate the pipeline with an outside of the engine compartment, wherein:

an end of the pipeline intercommunicates with the heat exchanger compartment, the urea aqueous solution pipe extends from a urea aqueous solution tank set under the heat exchanger compartment through the heat exchanger compartment and an end of the pipeline-forming member to be disposed in the pipeline, and the cooling air in a form of an outside air sucked by the cooling fan flows through the air intake hole to be delivered to the heat exchanger compartment to cool the urea aqueous solution pipe in at least one of the pipeline and the insulation space.

4. The cooling structure of the urea aqueous solution pipe according to claim 3, wherein:

a portion of the hood under which the pipeline-forming member is positioned is detachable from a remaining portion of the hood, and the pipeline-forming member is attached to the remaining portion of the hood.

* * * * *